Dec. 31, 1968 E. SHOHAN 3,419,033
CLOSURE AND DRAINAGE VALVE
Filed May 15, 1967 Sheet 2 of 2

INVENTOR
ELLIOT SHOHAN
BY J. F. Cuneo
ATTORNEY

United States Patent Office 3,419,033
Patented Dec. 31, 1968

3,419,033
CLOSURE AND DRAINAGE VALVE
Elliot Shohan, 4828 Mountain View,
San Bernardino, Calif.
Filed May 15, 1967, Ser. No. 638,260
11 Claims. (Cl. 137—107)

ABSTRACT OF THE DISCLOSURE

An automatic valve having a drainage outlet extending outside the valve body with a closure member seatable in the drainage outlet and having a pressure responsive element that is located in the body diametrically opposite the drainage outlet. The closure member is connected to the pressure responsive element by a flexible suspension that also supports a flow obstruction unit within the valve body. The flow obstruction unit becomes shifted when water flows through the valve body pulling the closure member into seated position and when pressure develops in the valve body the pressure responsive element moves outwardly holding the closure member in seated position. Turning off the water at the source terminates its flow and the pressure ceases to act on the pressure responsive element causing the closure member to unseat and opening the drainage outlet.

---

This invention relates to a new form of relief valve and shut-off valve and in particular to a relief and shut-off valve for use with light weight, thin walled irrigation tubing of large diameter when such large diameter pipe is assembled on a so-called wheel-move unit.

A wheel-move unit comprises a plurality of lengths of pipe that are securely coupled together and are supported a distance of approximately two and one-half feet above the ground by the hubs of a number of large diameter spoked wheels. The wheel-move assembly is driven from the center of a string of pipe, the string being sometimes one quarter of a mile in length, by a motor, either electric or gasoline supported by a platform that is associated with the central piece of pipe. This motor, through proper linkage such as a chain driven sproket, or other convenient form of transmission, drives the central piece of pipe and causes it to rotate and all of the pieces of pipe connected to the central piece are likewise driven in the same manner as an elongated axle. The wheels that are secured to the pipe passing through the hubs are thereby caused to rotate and will travel over the surface of the field.

The string of pipe can be rotated only when it is completely drained otherwise the weight of the water in the pipe would cause the pipes to sag in the middle and would place the driven section of pipe under severe shearing stress and would cause it to twist off and break the string. A number of different drain and shut-off valves have been tried and proposed but none of these has proven too satisfactory for the following reasons.

(1) None of the existing valves have been very dependable and all of them have caused considerable trouble.

(2) These valves do not behave as desired when the water in the lines is under its full pressure.

(3) Irrigation water usually carries some sand or gritty material, and any sand or grit that comes between the seat and the closure member will cause the valve to malfunction.

(4) The present form of valves, that are usually located a substantial distance apart, normally will not become closed when water just flows past them and usually the entire line must have become filled with water before the water in the pipe will be under sufficient pressure to cause the closure member to plug the drainage hole. Since there are usually forty valves in a quarter mile of pipe, a tremendous amount of water will escape through the forty valve openings before pressure in the pipeline will become high enough to cause the valves to close; this constitutes one of the major problems in the present in commercially available closure and drainage valve assemblies that are sold for wheel-move units.

The above drawbacks have greatly retarded the utilization of wheel-move irrigation systems and where the cost of water is a factor, have made them impractical.

A purpose of this invention is to provide a closure and drainage valve assembly that is particularly suitable for use in wheel-move systems, in which each valve will become closed as soon as the stream of water flowing through the pipeline passes that valve, and the valve will remain closed as long as water continues to flow therein, or the water in the pipe is under pressure. The valve opens immediately to drain whenever the flow of water is stopped and the pressure drops substantially to atmospheric pressure in the line, insuring rapid drainage of that section of the pipeline.

Another purpose of this invention is to provide a closure and drainage valve assembly that is not affected by the presence of sand or solid particles in the water flowing into the system.

A further purpose of this invention is to provide a closure and drainage valve assembly that will continue to operate satisfactorily regardless of the pressure at which the water flowing through the pipe is delivered.

An added purpose of this invention is to provide a drainage valve and closure valve assembly for a wheel-move system that serves also as a pipe coupler and will permit rapid connection or disconnection of the pipes, yet will positively transmit any rotational motion of the pipe to which it is connected to the adjacent section of pipe coupled to it.

A further purpose of this invention is to provide an economical, light weight, dependable closure and drainage valve assembly that is simple in construction and requires little or no maintenance.

I provide by my invention a new form of shut-off and drainage valve which is particularly adapted for use in a wheel-move system in which the drainage outlet becomes closed whenever water simply flows past the valve assembly, and the valve will remain closed as long as water is flowing through the pipeline and while the water is subjected to any pressure that is substantially above atmospheric pressure. The valve opens automatically whenever the flow of water is discontinued and the pressure on the water nears atmospheric pressure, such as would take place whenever the system is shut down. The valve according to this invention can be installed at any position in a section of pipe but it is ordinarily located at the central point between the supporting wheels, which is the location at which maximum bending of the pipe occurs due to the weight of the water in that section. One form of the valve is not associated with a coupler unit and this embodiment can be installed at any desired location along the pipe. The novel coupler described in my invention is capable of satisfactorily transmitting rotational movement, imparted to the pipe to which it is secured, to an adjacent length of pipe that is coupled to it.

The foregoing and subsequent description will be more clearly understood by referring to the accompanying drawings in which:

FIG. 4 is a longitudinal cross sectional view of an alternative embodiment of the closure and drainage valve assembly.

Figure 1:
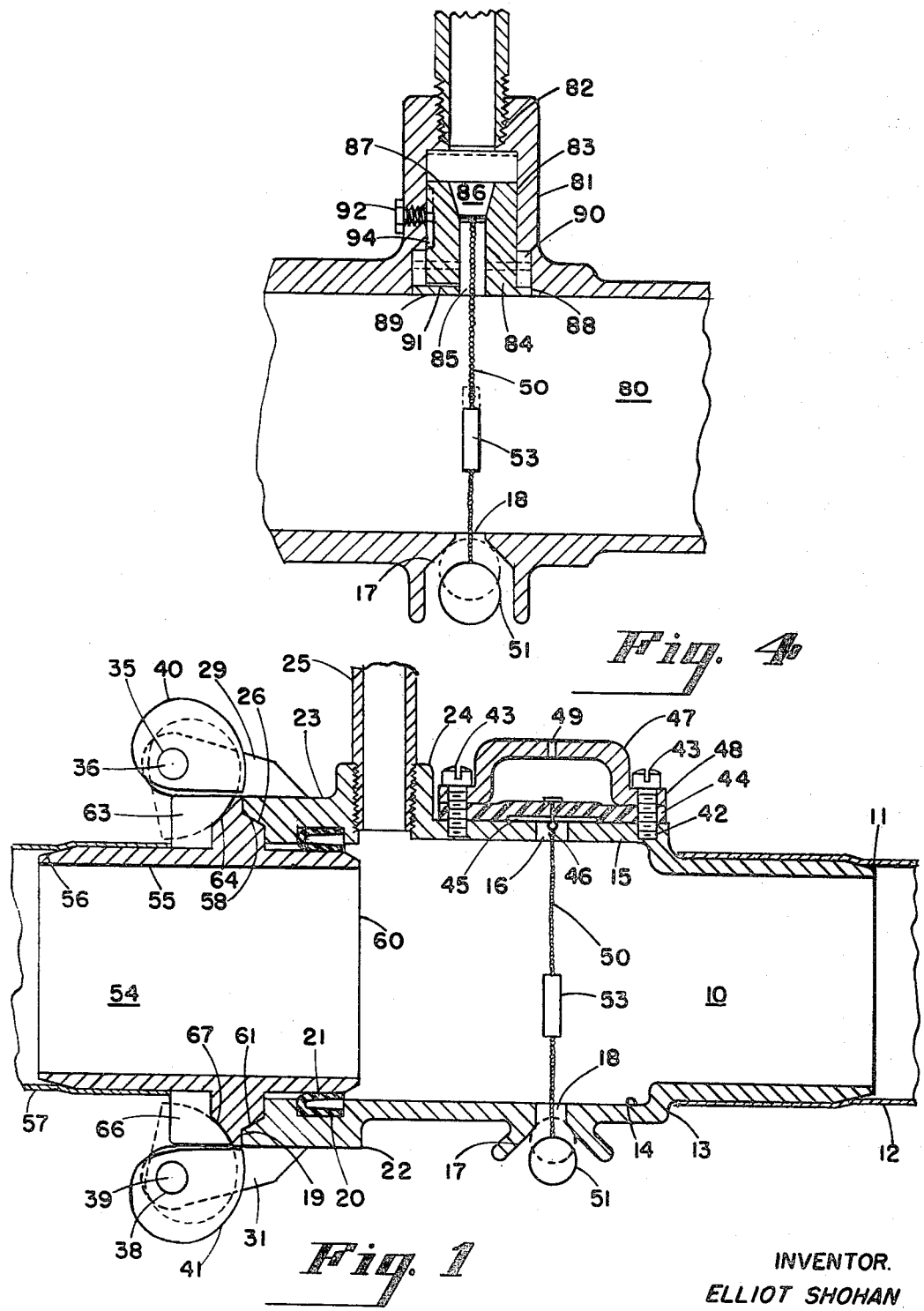
FIG. 1 shows a longitudinal cross sectional view of a preferred embodiment of a closure and drainage valve assembly with one embodiment of a coupler located at one end of the valve body. The coupler utilizes a rotating cam type of locking mechanism that is shown in the disengaged position by the solid lines and in the engaged position by the broken lines.
Figure 2:
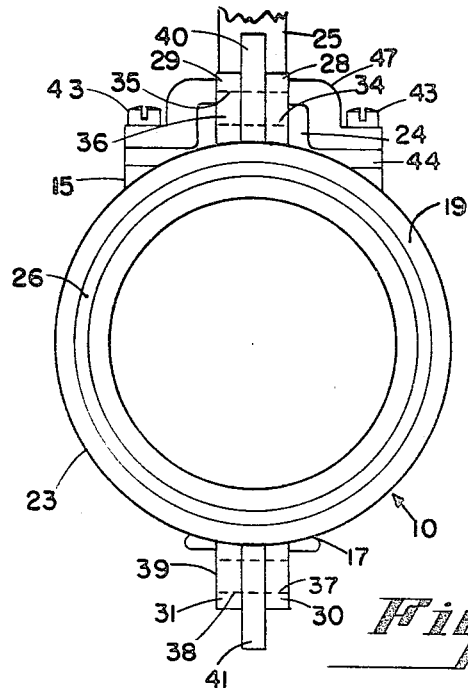
FIG. 2 is an end view of the valve body with the same coupler showing how it would appear without the cooperating coupling element that is included in FIG. 1.

Referring to the drawings, the coupler, closure and drainage valve combination shown in FIGS. 1 and 2, comprises a hollow body portion 10 that houses the valve mechanism. Body 10 is preferably cylindrical and end 11 of the body portion is slightly tapered to permit it to be inserted into the end of a length of pipe 12 that is of the so-called light weight, thin walled irrigation tubing. The inner diameter of the irrigation pipe is smaller than the maximum diameter of the valve body near end 11 and the pipe will tightly grip valve body 10 when the pipe is pressed on into position so that it rests against shoulder 13. The outer diameter of shoulder 13 is substantially larger than the diameter of end 11, as shown. The enlarged cylindrical surface of the valve body adjoining shoulder 13 is designated as portion 14.

One side of portion 14 is provided with a substantially circular platform 15 that is parallel to the longitudinal axis of the valve body and is symmetrically disposed about a diameter that is normal to the longitudinal axis of said body. A central bore 16 extends from the outer surface of platform 15 into the valve body, the axis of bore 16 also being the diameter mentioned above.

Diametrically opposite the center of bore 16, at what would normally be the bottom of portion 14, there is an outwardly extending projection 17 that is substantially funnel shaped with the throat of the funnel attached to portion 14. The throat of funnel shaped projection 17 is provided with an axial bore 18 that also extends through the wall of portion 14 into the valve body.

Enlarged body portion 14 continues at uniform internal diameter to the opposite end 19 of valve body 10 with the exception of an annular groove 20 that is located a short distance from end 19, and in groove 20 is seated a conventional V-shaped gasket 21 that receives that portion of a cooperating member attached to the adjoining length of pipe that enters the valve body when connection is made and seals the connection. The external surface of body 10 adjoining end 19 to a point 22 that is located a distance toward shoulder 13 from the inner edge of annular groove 20 is considerably larger in diameter than portion 14 and is designated on the drawings as 23. This is the thickest portion of the valve body.

A boss 24 is preferably located between circular platform 15 and enlarged body portion 23, extends outwardly from the surface of body 10 and is normal to the plane passing through platform 15. Boss 24 is threaded to receive a riser 25 of any desired length.

End 19 remains flat for a short distance and is then provided with a frustoconical recess 26 that extends into the valve body a short distance, the bottom of recess 26 is parallel to the plane passing through end 19. A pair of ears 28 and 29 in spaced relationship with each other, are secured to the outer surface of portion 23 and extend longitudinally a suitable distance from end 19. A second pair of ears 30 and 31 also in spaced relationship with each other, are positioned so that the center of the space between the ears is diametrically opposite to the center of the space between ears 28 and 29; these ears are also secured to the outer surface of portion 23 and extend longitudinally a suitable distance from end 19. The center line of each pair of ears is preferably located at the top and bottom of the valve body as shown in FIG. 1, however, if desired the center lines of the spaces between each pair of ears could be located on any other diametrical plane passing through end 19. Ears 28 and 29 are provided with transverse bores 34 and 35 respectively which support axle 36. Ears 30 and 31 are provided with transverse bores 37 and 38 respectively which support axle 39. A pair of cams 40 and 41 having a configuration shaped to approximate a portion of a spiral of Archimedes on the curved portion merging at each end with a straight portion, are provided with a bore located near the end having the curve of smallest radius, to be rotatably mounted on shafts 36 and 38 as the case may be, when mounted on the shafts the cams will lie in the space between ears 28 and 29 or ears 30 and 31 as the case may be.

Circular platform 15 is drilled and tapped near its outer circumference to form a circle of threaded bores 42 that are adapted to receive a corresponding number of cap screws 43. A flexible diaphragm 44 made from any suitable elastomeric substance such as rubber corresponds approximately in size to platform 15. Diaphragm 44 is preferably provided with a corresponding number of clearance holes to permit passage of cap screws 43. Diaphragm 44 has a centrally positioned washer 45 that is larger in diameter than bore 16 and a hook or ring projects from the center of washer 45 and extends a short distance into bore 16, the washer being on the side of the diaphragm that is in contact with plaform 15. Diaphragm 44 is held in place on platform 15 by dome-shaped cap 47 that has an outer rim 48 of the same diameter as platform 15 and has a corresponding number of clearance holes to permit passage of cap screws 43. When cap screws 43 are tightened against rim 48, diaphragm 44 is clamped in place and both diaphragm 44 and washer 45 rest on platform 15. Any pressure acting through bore 16 will cause diaphragm 44 to move into cap 47. When this occurs air in cap 47 would be compressed and could affect the operation of diaphragm 44, this is avoided by a vent or vents 49 that opens to the atmosphere and lets excess air escape.

If desired diaphragm 44 could be made water tight by providing platform 15 with an annular groove in which would be seated an O-ring that would become squeezed between platform 15 and diaphragm 44 when cap screws 43 were tightened against rim 48.

A thin, lightweight suspension member 50, such as nylon, or other plastic filament, or preferably a lightweight chain is attached to hook or ring 46 and extends through bore 18. A closure member such as a ball 51, made of rubber, cork, or other satisfactory material not readily deformed when placed in tension or compression, and substantially larger in diameter than bore 18, is secured to the free end of suspension member 50 so that when diaphragm 44 rests on platform 15 the closure member will hang freely in funnel shaped projection 17 clear of the bore 18 thereby forming an annular passageway.

A flow obstruction member which may be cylindrical, or may have a triangular, square, or other cross section, such as member 53 is made of sufficient length and secured, preferably axially, to suspension member 50. Member 53 is made of any light weight rigid material and is positioned on suspension member 50 so that when diaphragm 44 is resting on platform 15 the upper end of member 53 will lie approximately in the center of valve body 10 between bore 16 and bore 18. If desired member 53 could have its sides provided with longitudinal cup-shaped flutes or the member could be provided with transverse holes, both of which would create turbulent flow.

Figure 3:
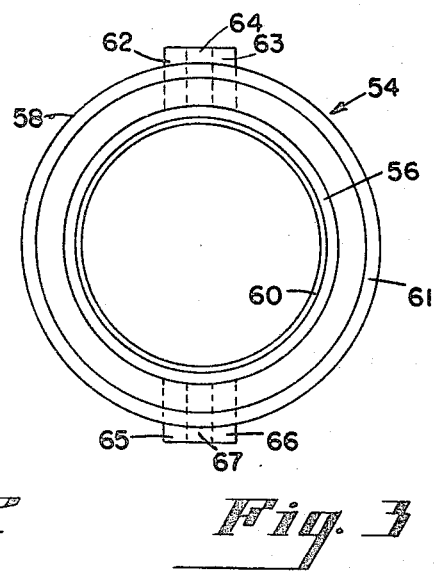
FIG. 3 is an end view of the cooperating coupling element that is secured to the end of the adjacent length of pipe, looking at the cooperating element from the valve entering end.

One form of cooperating member 54 for coupling adjoining pieces of pipe together is shown in FIGS. 1 and 3. This comprises a sleeve portion 55 having a tapered end 56 over which is stretched a second pipe 57 that is then pressed on a sufficient distance. At point 58 the diameter of the cooperating member increases abruptly forming a shoulder that ends when it corresponds with the maximum diameter of frustoconical recess 26. From this point the diameter of cooperating member 54 reduces uniformly as it progresses toward opposite end 60, forming a frustoconical projection 61 that corresponds with frustoconical recess 26. From the small end of frustoconical surface 61 the diameter of the cooperating member reduces sharply until it is slightly smaller than the diameter of the opening into valve body 10 at end 19. End 60 is preferably tapered as shown in FIG. 1 to facilitate its insertion into the valve body and through the gasket seated in annular groove 20.

A pair of lugs or projections 62 and 63, in spaced relationship with each other extend from shoulder 58 and are secured to the surface of cooperating member 54. The top of projections 62 and 63 is flush with the maximum diameter of shoulder 58 and they extend toward sleeve 55 a sufficient distance so that when cooperating member 54 is seated in frustoconical recess 26 and the valve body 10, the end of each projection will be approximately below the axis of axle 36. The gap between projections 62 and 63 is slightly more than the thickness of cam 40. The inner end of the space between projections 62 and 63, adjoining shoulder 58 is provided with a curved surface 64 that corresponds in shape to that surface of cam 40 near the end of the curve and having the maximum radius from its axis of rotation. A second pair of projections corresponding in size and shape to projections 62 and 63 are designated 65 and 66, are in spaced relationship with each other, extend from shoulder 58, and are positioned diametrically opposite projections 62 and 63. The gap between projections 65 and 66 is slightly more than the thickness of cam 41 and the inner portion of the space between projections 65 and 66, adjoining shoulder 58 is occupied by a curved surface similar to curved surface 64.

In some applications it could be advantageous to provide two additional pairs of ears similar to ears 28 and 29 and ears 30 and 31. These additional ears would be secured to the outer surface of portion 23, each pair of ears being located 90° from ears 28 and 29 or ears 30 and 31. Both of these additional pairs of ears would support a cam similar to cams 40 and 41. The cooperating member 54 would in this type of construction be provided with two additional pairs of lugs similar to 62 and 63 or lugs 65 and 66 secured to the outer surface of member 54. The space between each pair of lugs adjoining the shoulder 58 would likewise be provided with a curved surface similar to curved surface 64 or 67. Locking contact in this type of construction would occur every 90°.

Figures 5, 6:
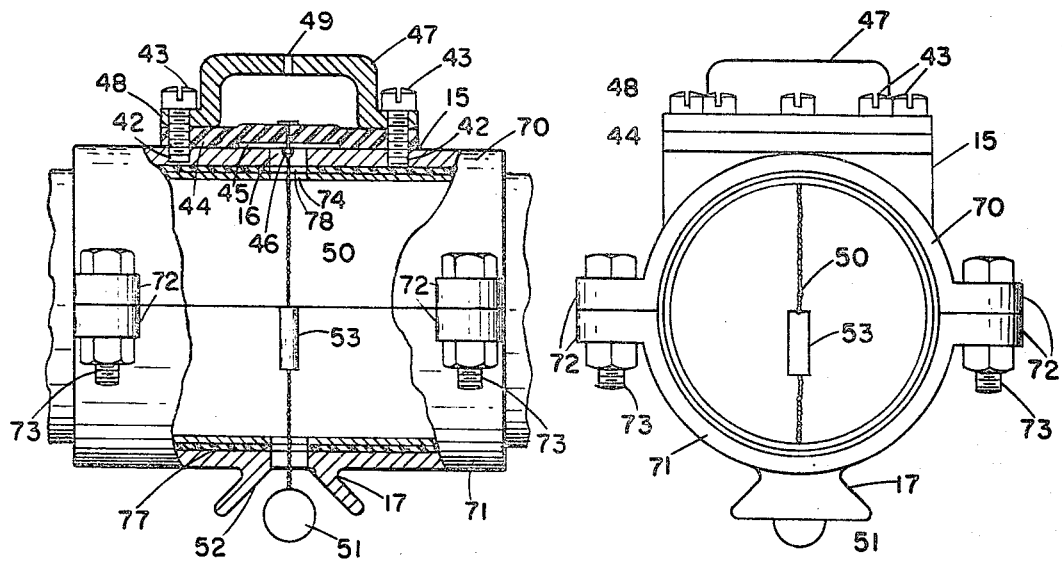
FIG. 5 shows a closure and drainage valve similar to the one shown in FIG. 1 without any coupler and formed by a pair of semicylindrical cooperating halves, suitable for attachment at any position along a length of pipe, the view is partly in cross section.
FIG. 6 is an end view of the closure and drainage valve assembly that is shown in FIG. 5.

FIGS. 5 and 6 show a shutoff or closure and drainage valve for a wheel-move unit that does not include a coupler and may be installed at any position in a length of pipe. This valve body is formed by clamping matching halves 70 and 71 together, these halves being semicylindrical. Each half is provided with correspondingly positioned projections 72, preferably located at or near each of the four corners of halves 70 and 71. The lower surface of each projection is slightly spaced above the plane passing through the junction of the two halves. Each projection is bored to permit passage of bolt 73 that serves to clamp the two halves together on a pipe when a nut is threaded on each bolt 73 and tightened; when the two halves are clamped together they form a complete valve body.

First half 70 is provided with a platform 15 that is positioned the same as platform 15 of FIG. 1. Platform 15 has a central bore 16 that registers with a hole 74 drilled in the wall of the pipe. Threaded bores 42 are positioned in circular arrangement on platform 15 to receive cap screws 43. Diaphragm 44 is provided with washer 45, hook or ring 46 and is secured to platform 15 by dome shaped cap 47 in the same manner as described in FIG. 1. Cooperating half 71 has funnel shaped projection 17 and when the two halves are assembled, the longitudinal axis of projection 17 will be positioned diametrically opposite the center of opening 16. Bore 18 at the throat of funnel shaped projection 17 registers with a correspondingly located opening 75 cut through the wall of the pipe.

If desired a boss similar to boss 24 above, could project from half 70 to receive a riser, however, in such a construction it would be necessary to provide an additional registering hole in the pipe to permit water from the pipe to flow into the riser. The assembled valve body again requires suspension member 50, closure member 51, and flow obstructing member 53 mounted on suspension member 50 as described in the valve assembly of FIG. 1.

A gasket of resilient material such as rubber or other elastomeric substance, designated as 77, fits around the pipe and is squeezed between the inner surfaces of the two halves and the outer surface of the pipe. Gasket 77 is provided with holes 78 and 79 that register with bores 16 and 74 and bores 18 and 75 respectively. If desired this assembly could be made water tight by providing the internal surface of each half with a continuous channel surrounding the openings in each half through which water could escape and fitting an O-ring in the channel that would be clamped between the pipe and the channel when the halves are tightly clamped together.

FIG. 4 shows a modified closure and drainage valve construction in which valve body 80 is provided with a bosslike projection 81. A riser is threaded into threaded end porton 82. Below end portion 82 bosslike projection 81 is counterbored to receive the body portion 83 of a cylindrical piston 84 that has an axial bore 85 extending its entire length. Upper portion 86 of bore 85 preferably enlarges uniformly in diameter as it progresses toward end 87 of piston 84; this diminishes turbulence between piston 84 and the riser. The lower end of bosslike projection 81 is provided with a second axial counterbore 88 that is larger in diameter than the first counterbore and continues into projection 81 a short distance. Counterbore 88 receives head 89 of piston 84 which is short in length leaving a substantial annular air space 90 above the head 89 when piston 84 is at its lowest position as shown in FIG. 4. A small channel 91 extends from bore 85 into space 90 and vents any air in space 90 that would otherwise become compressed by head 89 as the piston moves toward the riser. A set screw 92 having a guiding end portion 93 is threaded through the wall of projection 81 at a position so that end 93 will seat in guide slot 94 located on piston 84.

In this embodiment the suspension means is a light chain 50 and the upper end of the chain is supported by a transverse pin 95 located near the upper end of piston 84. Ball 51 is secured to the other end of chain 50 which supports flow obstruction member 53 in valve body 80 in the same manner as was described in the valve body of FIG. 1. The lower end of valve body 80 is provided with diametrically oppositely positioned funnel shaped projection 17 that has bore 18 and otherwise resembles the construction shown in FIG. 1. Valve body 80 may be provided with the coupler arrangement shown in FIGS. 1, 2 and 3, however, any other form of pipe coupler that is satisfactory could be employed. This valve body 80 could also be formed in two halves as shown in FIGS. 5 and 6 if desired.

It is intended that any coupler arrangement that will satisfactorily unite two lengths of pipe together and permit the driven portion of the string of pipe to transmit rotational motion to the remainder of the lengths of pipe connected to it, may be used in place of the coupler construction that utilizes the cam type of lock. This applies to all valve bodies requiring couplers.

The manner in which the coupler shown in FIGS. 1, 2 and 3 operates is as follows: a pipe 12 is secured to the tapered end of valve body 10 by any conventional method such as pressing it on, welding it on, clamping it on or securing it to the valve in any other suitable manner. The cooperating member 54 is likewise secured to one end of its respective pipe in the same manner as pipe 12 was secured to body 10. Frustoconical projection 61 is fitted into frustoconical depression or recess 26 and is fully nested therein when the free end of cooperating member 54 is inserted into V-shaped gasket 21 at the end portion of valve body 10. Cams 40 and 41 pivotally supported by projections 28 and 29 and projections 30 and 31 respectively are positioned during this insertion step so that their flat surfaces are parallel to the longitudinal axis of valve body 10 as shown in the solid lines in FIG. 1. Pipe 57 is turned so that projections 62 and 63 and projections 65 and 66 are in radial alinement with projections 28 and 29 and projections 30 and 31 respectively so that the gaps between projections 62 and 63 and projections 65 and 66 are in registering position to receive cams 40 and 41 respectively. Cam 40 is rotated in a counterclockwise direction until the surface of the cam comes in tight contact with curved surface 64 between the projections while cam 41 is rotated in a clockwise direction until it bears tightly against curved surface 67 between the projections; both cams are rotated until each cam can turn no further and each cam is then tapped to force it still tighter against its respective curved surface thus locking the cooperating member and that end of the valve body together as shown in the dotted line drawing of FIG. 1. Rotational movement is transmitted by the cams when in contact with their respective projections of the cooperating member. To disconnect the pipe from the body the cams are caused to rotate in the opposite direction until they are again clear of the projections of the cooperating member. The frustoconical projection and recess permit easy separation which can be accomplished as soon as the end of the cooperating member is withdrawn from the V-gasket or other gasket used to effect a seal between the two elements.

The manner in which the valves shown in all embodiments operate is as follows: Before any water starts to flow in the pipe supporting the valve body, the closure member such as ball 51 will be hanging in the throat of the funnel in spaced relationship with the inner surface of the funnel shaped projection due to gravity. Diaphragm 44 and washer 45 will be resting against the surface of platform 15 with the washer covering bore 16. Cylindrical member 53 that serves to obstruct the flow of water will be mounted on suspension member 50 so that its upper end will be near the longitudinal axis of the valve body. Water is turned on to flow into pipe 12 and the velocity of the stream of water striking obstruction member 53 will cause it to move to the left thereby shortening the length of member 50 and causing ball 51 to be drawn tightly against the opening of bore 18 preventing further discharge of water through that orifice. When this occurs the pressure on the water in the pipe will commence to rise and as this pressure increases diaphragm 44 will start to rise above platform 15, uncover bore 16 and the flexible diaphragm will stretch into cap 47 as far as suspension member 50 will permit it to travel. Suspension member will now resume a substantially vertical position and the end of obstruction member 53 will be substantially above the longitudinal axis of valve body 10. Water will now flow from the pipe into the riser and through the sprinkler mounted at the end of the riser. As long as pressure remains on the water in valve body 10, ball 51 will remain seated in the throat of funnel shaped projection 17 and no water will leak out.

When the system is shut down pressure will be removed from the valve body and the flow of water will stop in the pipe. As soon as the pressure ceases the diaphragm will again rest on platform 15 causing the suspension member to drop and this plus the weight of water over the closure member will cause the closure member to drop permitting the water in the pipe to flow out.

I claim:

1. A closure and drainage valve for thin walled irrigation pipe, comprising: a tubular valve body having a first opening into said body that is located at one side thereof, the central point of said opening being on a diametrical axis that is normal to the longitudinal axis of said valve body; pressure responsive means secured to the outside of said valve body over said first opening and having a movable element connected therewith that is positioned to cover said first opening when no pressure is acting within said valve body, said movable element being in spaced relationship with said first opening when said valve body is under internal pressure; a funnel-shaped projection extending from the opposite side of said valve body, the longitudinal axis of said projection coinciding substantially with said diametrical axis passing through the center of the first opening; a second opening into said valve body extending through the throat portion of said projection; flexible suspension means secured at one end to said movable element of the pressure responsive means and extending into the throat portion of the projection through said second opening; a closure member substantially larger than said second opening and having a surface seatable in the throat portion of the projection, secured to the opposite end of said flexible suspension means, said closure member being in spaced relationship with the wall of said projection and the second opening when there is no pressure within said valve body or no water flowing therethrough, and in seated position whenever water is flowing through said valve body or pressure is acting within the valve body; and a flow obstructing member secured to the suspension means at a position intermediate the first and second openings and within said valve body.

2. A closure and drainage valve for thin walled irrigation pipe according to claim 1 wherein the valve body is provided with a pipe coupling means at one end thereof and the opposite end of the tubular valve body is secured to a pipe end.

3. A closure and drainage valve for thin walled irrigation pipe according to claim 1, wherein the movable element comprises a resilient diaphragm and the end of the suspension means is secured to the central portion of said diaphragm.

4. A closure and drainage valve for thin walled irrigation pipe according to claim 1, wherein the movable element comprises a piston having a centrally disposed passageway extending therethrough, and means associated with said piston for securing one end of the flexible suspension means to the piston.

5. A closure and drainage valve for thin walled irrigation pipe according to claim 1, wherein the flexible suspension means secured to the movable element at one end and the closure member at the other end comprises a length of flexible link chain.

6. A closure and drainage valve for thin walled irrigation pipe according to claim 1, wherein the closure member at the end of the suspension means is spherical, the core of said sphere being substantially nondeformable material with the outer surface of said sphere being sufficiently resilient to form a water tight seal with the inner throat portion of the funnel shaped projection when said closure member is placed in contact with said funnel shaped surface.

7. A closure and drainage valve for thin walled irrigation pipe according to claim 1, wherein the flow obstruction member attached to the flexible suspension means is cylindrical.

8. A closure and drainage valve for thin walled irrigation pipe according to claim 7 wherein the flow obstructing member is cylindrical and is provided with transverse orifices extending therethrough.

9. A closure and drainage valve for thin walled irrigation pipe, comprising: a composite tubular valve body to be attached to a pipe at a predetermined position, said composite body having a first and a second semicyclindrical annular section, each section being provided along its longitudinally extending matching surfaces with laterally extending, cooperating clamping means to secure said semicyclindrical sections together, the diameter of the resulting inner cylindrical surface being large enough to fit over the external surface of the pipe; a first opening located on said first semicyclindrical section at a position intermediate the longitudinally extending matching surfaces thereof and positioned a predetermined distance from the semicircular ends thereof, the center of said opening being on one end of a diametrical axis that is normal to the longitudinal axis of the assembled tubular valve body, said opening extending through the first semicyclindrical section; a second opening extending through said second semicyclindrical section at the throat of a funnel shaped projection extending outwardly from said second semicyclindrical projection, the central point of said second opening and the longitudinal axis of the funnel shaped projection being located at the opposite end of the diametrical axis passing through the center of said first opening, when the two semicylindrical halves are secured together to form the tubular valve body; a first and a second opening in said pipe positioned to register with said first and second openings in the first and second semicyclindrical sections respectively when said sections are assembled; gasket means between said sections of the composite valve body and the openings in said pipe to prevent water flowing through the first and second openings in said pipe and into the respective first and second openings of the composite valve body from escaping between said pipe and said composite valve body; a pressure responsive means secured to the outside of the first section of the composite valve body and positioned over said first opening, said means including a movable element that is positioned to cover said first opening when no pressure is present in said valve body but will be placed in spaced relationship with said first opening when the valve body is under pressure; a flexible suspension means secured at one end to said movable element and extending through said composite body and through the second opening into the throat of said funnel shaped projection; a closure member substantially larger than said second opening and having a surface seatable in the throat portion of the projection, is secured to the opposite end of the flexible suspension means, said closure member being in spaced relationship with the inner wall of said projection and said second opening when no pressure is acting within said valve body and no water is flowing therethrough, and being in seated position when water is flowing therethrough or said valve body is under pressure; and a flow obstructing member attached to said suspension means at a position intermediate said first and second openings in said composite valve body.

10. A closure and drainage valve for thin walled irrigation pipe, comprising: a tubular valve body provided with a platform located at one side thereof, said platform being substantially uniformly disposed about one end of a diametrical axis that is normal to the longitudinal axis of said body; a first opening into said valve body centrally positioned through said platform; a funnel shaped projection extending from the opposite side of said valve body and having its longitudinal axis substantially coinciding with the opposite end of said diametrical axis; a second opening into said valve body extending from the throat of said funnel shaped projection; a flexible diaphragm on said platform covering said first opening when said diaphragm is in contact with said platform, the central portion of said diaphragm being provided with supporting means extending toward said first opening; means associated with said platform for securing the rim of said diaphragm to said platform and forming a water tight seal therewith, yet permit the remainder of the diaphragm to stretch a predetermined distance from said platform; a flexible suspension means secured at one end to the supporting means of said diaphragm; a closure member substantially larger than said second opening and having a surface seatable in the throat portion of said funnel shaped projection, attached to the opposite end of said suspension member, said closure member being in spaced relationship with the funnel shaped member and said second opening when the central portion of the diaphragm is resting on said platform; and a flow obstruction unit secured to said suspension member at a position intermediate the first and second openings.

11. A closure and drainage valve for light weight irrigation pipe according to claim 10 wherein one end of said tubular valve body is provided with a pipe coupling means and the other end thereof is secured to the end of a section of pipe.

References Cited

UNITED STATES PATENTS

| | | | |
|---|---|---|---|
| 477,239 | 6/1892 | Wright | 137—107 |
| 3,068,025 | 12/1962 | Stilwell | 137—107 XR |

HAROLD W. WEAKLEY, *Primary Examiner.*

U.S. Cl. X.R.

137—499